Jan. 28, 1964    R. H. PETERSON    3,119,890
ELECTRONIC ORGAN OBTAINING REVERBERATION EFFECTS
UTILIZING A LIGHT SENSITIVE RESISTOR
Filed June 22, 1959    5 Sheets-Sheet 1

Fig. 1.

Inventor
Richard H. Peterson
Donald H. Sweet
Attorney

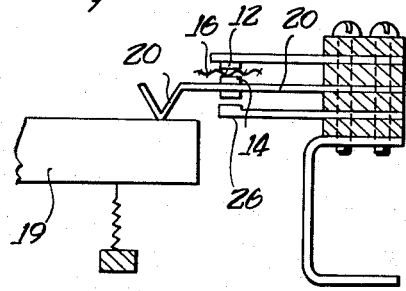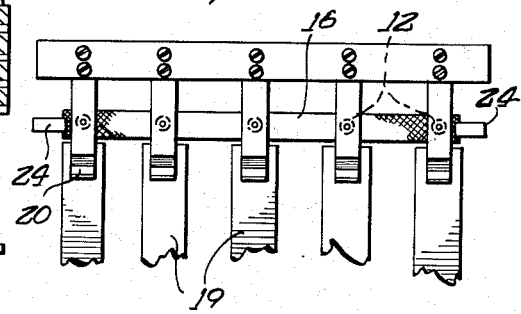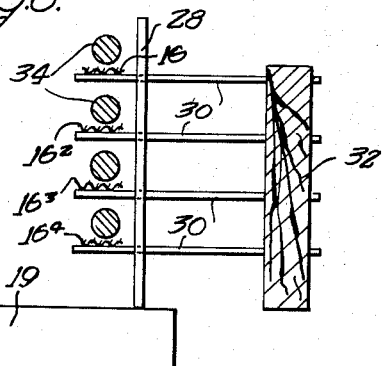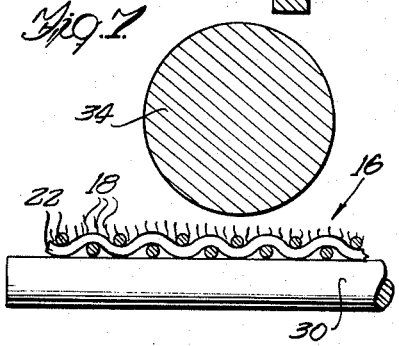

Jan. 28, 1964      R. H. PETERSON      3,119,890
ELECTRONIC ORGAN OBTAINING REVERBERATION EFFECTS
UTILIZING A LIGHT SENSITIVE RESISTOR
Filed June 22, 1959                    5 Sheets-Sheet 4
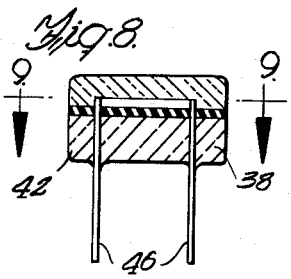
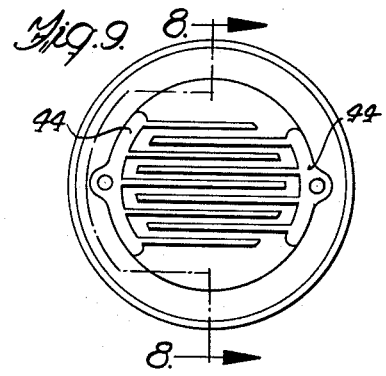
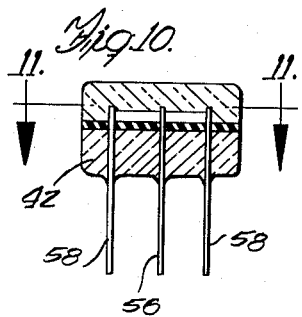
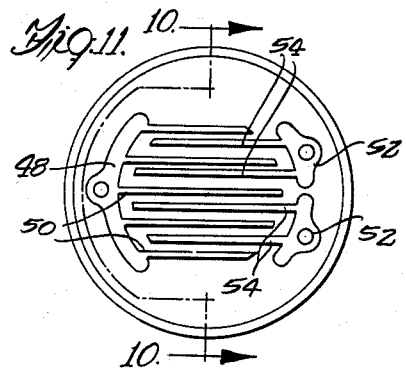
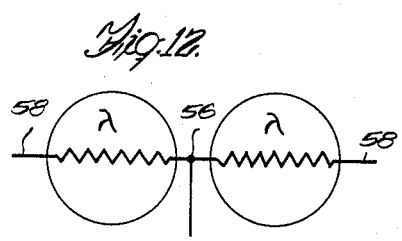
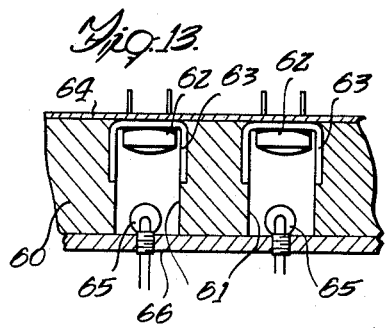
Inventor
Richard H. Peterson
Donald H. Sweet
Attorney

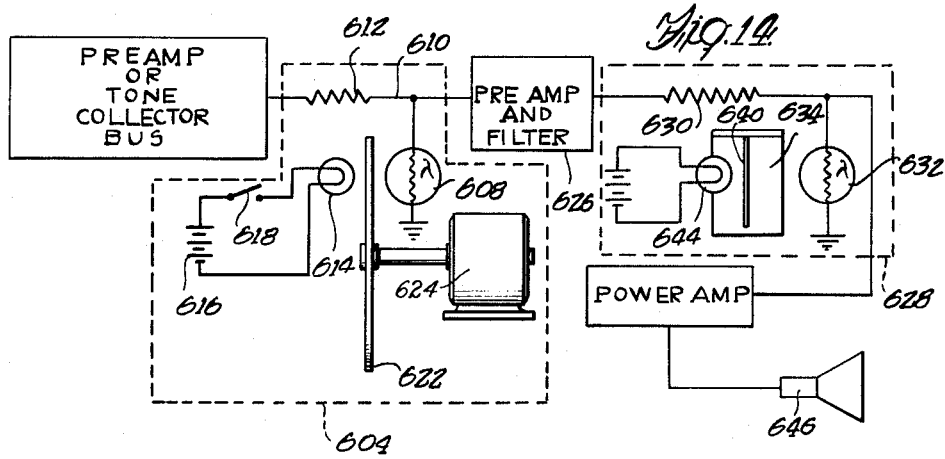
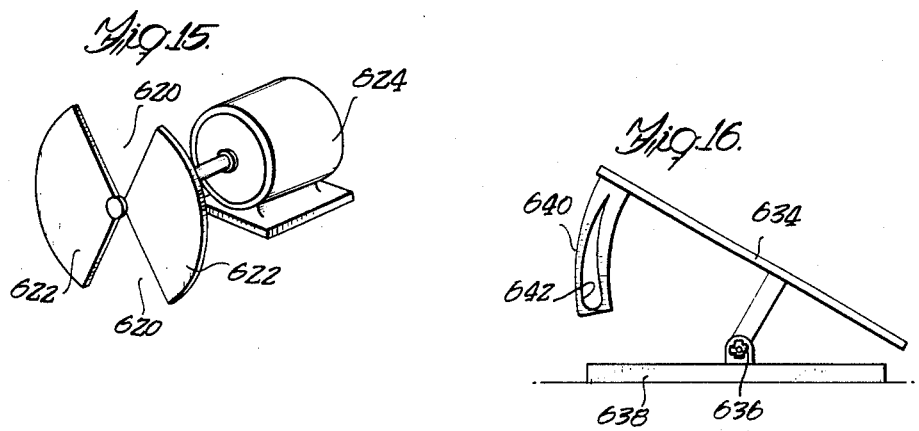
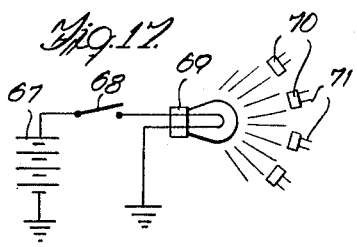

United States Patent Office 3,119,890
Patented Jan. 28, 1964

3,119,890
ELECTRONIC ORGAN OBTAINING REVERBERATION EFFECTS UTILIZING A LIGHT SENSITIVE RESISTOR
Richard H. Peterson, 10108 Harnew Road E., Oaklawn, Ill.
Filed June 22, 1959, Ser. No. 822,111
7 Claims. (Cl. 84—1.25)

This invention relates to musical instruments and includes among its obects and advantages: (1) a new and improved electronic tone-generating system employing continuously oscillating transistor oscillators; (2) a new and improved means for obtaining vibrato effects in transistor oscillators; (3) cheap and simple pressure-sensitive electric switching means for switching the signals from a tone-generator into an amplification system without key clicks, thumps, or other undesirable transient sounds; (4) new and improved electronic key switching means employing photo-sensitive resistors for duplicating most exactly certain desired attack and decay characteristics, such as those of conventional organ pipes, as well as producing percussion effects when desired; (5) new and improved means for obtaining tremolo effects; (6) new and improved expression control means.

Further objects and advantages of the invention will become apparent subsequently.

In the accompanying drawings:

FIGURE 1 is a general circuit diagram of the essential parts of an electronic organ embodying certain features of the invention;

FIGURE 4 is a side elevation of a pressure-sensitive key switch;

FIGURE 5 is a plan view, on a reduced scale, of five switches according to FIGURE 4, arranged side-by-side;

FIGURE 6 is a side elevation indicating the use of similar pressure-sensitive switching means in a multiple switch;

FIGURE 7 is an enlarged fragment of FIGURE 6;

FIGURE 8 is a partly diagrammatic section as on line 8—8 of FIGURE 9 of a photo-sensitive resistor;

FIGURE 9 is a section of the same resistor on line 9—9 of FIGURE 8;

FIGURE 10 is a section on line 10—10 of FIGURE 11 of a photo-resistor having three terminals and two built-in resistances;

FIGURE 11 is a section on line 11—11 of FIGURE 10;

FIGURE 12 is the typical wiring diagram arrangement for indicating the unit of FIGURES 10 and 11 as part of a complete circuit;

FIGURE 13 is a structural sectional view indicating a suitable mounting panel for a series of resistors according to FIGURES 8 to 11 inclusive;

FIGURE 14 is a general wiring diagram of a translating system for a complete organ, in which resistors according to FIGURES 8 to 11 may be employed to secure desirable tremolo effects and desirable expression control;

FIGURE 15 is a perspective view of a motor driven optical interrupter;

FIGURE 16 is a side elevation of a light-control plate actuated by the expression-control pedal; and FIGURE 17 is a diagram of a single key switch arranged to connect up a multiplicity of entirely independent circuits by means of a single contact.

Figure 2:
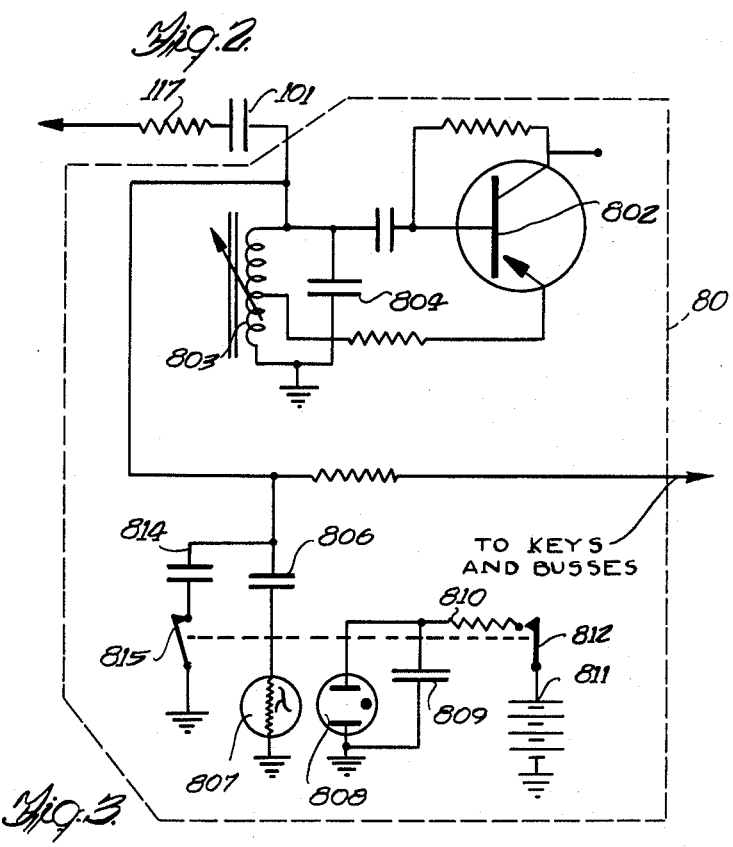
FIGURE 2 is a general circuit diagram of a transistor oscillator of the type suitable for use as a controlling, or master, oscillator, together with an associated means for obtaining a highly satisfactory vibrato effect.

Throughout this description, it is intended to employ the word "vibrato" for a variation in tone that is substantially entirely a matter of frequency, and the word "tremolo" for a variation in loudness of intensity. Both effects are useful in certain ways, but they are by no means the same thing. In both effects, the frequency of the variation is about seven cycles per second, more or less, but the shape of the curve of variation in time during each cycle may vary greatly, and in that shape reside many differences in esthetic effect. According to the invention, a vibrato of precisely predetermined characteristics may be produced in the master oscillator itself, by means that permits the selection of a considerable variety of time shapes. Also, tremolo circuits affording a similar variety of esthetically beautiful shapes are provided but in the translating means rather than in the tone generator.

In the embodiment selected to illustrate the invention, and referring first to FIGURE 1, I have indicated an all-transistor tone-generating system of the cascade oscillator type.

It is convenient to subdivide the entirety indicated in FIGURE 1 into the tone generator, comprising the master oscillator 80, and four controlled oscillators 100, 200, 300, and 400; the translating system including two tremolo coupling circuits 602 and 604, two filters 626, one expression control 628, an amplifier and a loud speaker 646; and the keying system electrically interpolated between the generating and translating systems.

The tremolo coupling circuit 604 controls the signals from the switches 16 in the lower, or accompaniment manual, and the tremolo coupling circuit 602 controls the signals from the light-sensitive switching means 232 and 332, and so forth, in the upper or solo manual. It is customary to provide separate tremolo effects on either or both manuals of conventional two-manual organs.

To simplify the use of reference characters in the drawings, many corresponding parts of the controlled oscillators 100, 200, 300 or 400 are given numbers with the same last two digits, preceded by the third last digit 1, 2, 3 or 4, corresponding to the number for the complete oscillator.

*The Tone Generator*

The tone generator has a single master oscillator for each of the twelve notes of the chromatic scale. Each of these twelve oscillators is a highly stable oscillator that will remain in tune for long periods of time regardless of changes in power line voltage, tempertaure, humidity, and the like. The oscillators for producing all the other musical notes corresponding to all of the other octaves of a complete organ are generated by relatively simple "controlled" oscillators.

FIGURE 1 includes only one of the master oscillators and the lower pitched oscillators controlled thereby. The master oscillator 80 is connected to a series of four cascaded controlled oscillators, 100, 200, 300 and 400. The master oscillator generates and delivers to the amplification system the highest frequency for the particular note involved. The controlled oscillator 100 is connected to the master oscillator 80 to oscillate at half the frequency of the master oscillator. The next controlled oscillator 200 has half the frequency of oscillator 100, and so on through oscillators 300 and 400, covering a total range of five musical octaves.

Synchronizing signal from the master oscillator 80 passes to the first controlled oscillator 100 through a coupling circuit comprising capacitor 101 and protective resistor 117. The components constituting the oscillator proper 100, are enclosed in a dotted rectangle for convenience in clear illustration. Controlled oscillators 200 and 300 duplicate oscillator 100 except for mere proportions, and have been indicated only diagrammatically. The lowest pitch controlled oscillator 400, differs in some respects and has been diagrammed completely.

In oscillator 100 I have indicated a conventional PNP germanium transistor 102, having a base 104, an emitter 106 and a collector 108. Power at minus 10 volts D.C. is received at terminal 110, and passes through the higher impedance winding 112 of a transformer 114, having a secondary 116 of about half as many turns as the primary. From the winding 112 the input connection is to the collector 108.

The other winding 116 is connected to the base 104, and to ground through timing resistors 118 and 120, which are in shunt with timing capacitor 115. The output winding 116 feeds energy back to the input winding 112 and sustains the oscillation.

The transformer 114 couples two circuits. The winding 116 is part of the base-emitter circuit, which can be traced from ground through emitter 106, transistor 102, base connection 104, winding 116, and from there back to ground through resistors 118 and 120 with capacitor 115 in parallel with the two resistors. The other winding 112 is part of the output circuit, which can be traced from ground through emitter 106, through transistor 102 to collector 108, and from there to winding 112, to the source of power, with the resistor 126 shunted across the winding 112 to provide the takeoff for the synchronizing pulse for the next oscillator. Energy feeds back from the output circuit containing winding 112 to the base-emitter circuit containing winding 116 at a frequency determined by the time constant of capacitor 115 and the total resistance of the circuit, including timing resistors 118 and 120, and the internal resistances of the other circuit elements.

The natural frequency of oscillator 100 is determined by the value of timing capacitor 115, and the total resistance of the output circuit in which timing resistors 118 and 120 are located.

Such an oscillator is dependable and inexpensive, but quite unstable, depending on the supply voltage and on temperature because the resistance of the transistor itself varies with temperature. Because it is thus unstable, it can easily be synchronized by the introduction of a relatively small amount of energy from the master oscillator 80. To get the controlled oscillator 100 to "lock in" at half the master frequency, requires only a suitable value for capacitor 115 and resistors 118 and 120. The tuning is completed by adjustment of resistor 118, as indicated by the arrow 122, to a value as close to the true value as the sensitivity of the adjustment permits.

Resistor 120 is about 10% or less of the value of resistor 118, and therefore junction 124 between them is a point from which output signal can be taken without substantially loading the circuit. Resistor 126, connected across the primary of the transformer 114, limits the peak voltage developed in the transformer to a safe value so as to prevent damage to the transistor.

This resistor 126 is also provided with a sliding potentiometer tap 128 that is connected to the synchronizing capacitor 130 that couples energy into the next lower "controlled" oscillator, 200. The oscillator 200 is the same as the first controlled oscillator 100 except that its timing resistors and its timing capacitor are selected so that this oscillator will tend to operate at a frequency a little below an octave below the frequency of the first controlled oscillator 100.

Now by adjusting the potentiometer 126, 128 it is possible to vary the amount of synchronizing current applied to the base circuit of oscillator 200 and this affords a very desirable and highly efficient method of adjusting oscillator 200 to lock in at the exact ratio of 2 to 1 with respect to the first controlled oscillator, while at the same time preventing any feed back through the coupling between oscillators 100 and 200, that might otherwise effect the constancy of the master oscillator 80.

Oscillator 300 is identical to the second controlled oscillator 200 except that it, in turn, is adjusted to tend to operate at a frequency a little below one octave below the second controlled oscillator 200.

Oscillator 100 has a resistor 141 between the collector 108 and base 104, and a resistor 143 between the emitter 106 and base 104. Either one or both of these resistors may be omitted, but their presence improves the temperature stability.

In the fourth controlled oscillator the emitter 408, instead of being connected to ground, is connected through a resistor 429, which is shown by passed by a capacitor 431. These two parts bias the transistor and contribute to stability of operation particularly with respect to temperature variations. Capacitor 431 is not absolutely essential, particularly if resistor 429 is of a relatively low value. If resistor 429 is of a very high value, capacitor 431 is necessary to prevent degeneration, which would affect the wave form produced as well as the frequency of operation and the output voltage.

The fourth controlled oscillator is also shown as being "shunt fed." In this circuit configuration, a capacitor 417 is connected between the collector 408 of transistor 402 and the primary winding of transformer 414. The other end of the primary winding is connected to ground. The operation of this circuit is substantially similar to that of the other circuits shown but it has the advantage that there is no D.C. voltage on the primary winding of the transformer, and in addition the collector current for transistor 402 is fed through the resistor 426 with the result that the current in the collector circuit of this transistor is limited by the resistance of resistor 426.

*The Master Oscillator*

FIGURE 2 shows one form of master oscillator that may be advantageously employed in connection with the invention. This oscillator employs transistor 802 in a circuit whose frequency of oscillation is determined by the constants of the inductance 803 and the capacitor 804. The details of this type oscillator are more fully disclosed in my co-pending application 596,544 filed July 9, 1956, now Patent 2,906,959 issued September 29, 1959.

The impedance of the tuned circuit 803, 804 is quite low in comparison to the resistance of the resistor 117 and the impedance of capacitor 101. Thus energy can be transmitted from the master oscillator through capacitor 101 and resistor 117 into the first controlled oscillator, but vary little energy is permitted to be transferred from the controlled oscillator back to the master oscillator, and therefore practically no contamination of the master oscillator's signal is encountered and the signal from the master oscillators may be used for the highest octave of musical tones produced by the organ.

For obvious reasons it is important that the master oscillator be highly stable and not influenced by changes in temperature or power supply voltages or other variables. This, however, creates a problem, in that, to produce vibrato effects, it is, as is well known in the art, common practice to introduce frequency modulation into the master at a vibrato periodicity of about seven times per second. With oscillators that are not too stable, it is possible to create this frequency modulation by varying a power supply voltage but where the oscillator is extremely stable it becomes difficult to produce the frequency modulation without extensive and expensive auxiliary apparatus.

This problem is solved in a simple way by employing the circuit of FIGURE 2. Capacitor 806 is of the order of 5% of the capacitance of tuning capacitor 804 and is arranged so that when it is connected across the tuned circuit it will cause the desired change in the pitch of the master oscillator. Connected in series with this capacitor is a photo-resistor 807 which will be described in more detail hereinafter. It is a characteristic of this device that its resistance is highly dependent upon the amount of light energy falling upon its surface. It is also a characteristic of this device that its resistance does not change instantaneously, with changes in light intensity, but there is a slight lag in the order of a small fraction of a second. A gas-filled tube 808 is connected with capacitor 809 and resistor 810 to form a relaxation oscillator. 811 is a power supply source of somewhat higher potential than is required to strike or ignite the gas in tube 808. If the vibrato is turned on by closing switch 812 the capacitor 809 will charge gradually through resistor 810 until the voltage across capacitor 809 is sufficient to ionize the gas in tube 808, at which time the bulb will light, casting its light on photo-resistor 807 which then becomes a low resistance and causes capacitor 806 to lower the pitch of the oscillator. However, since the gas-filled tube is connected across capacitor 809, the discharge current in tube 808 soon causes the voltage to drop below the extinction potential of the lamp 808 and the lamp therefore goes out and the resistance of photo-resistor 807 again rises smoothly and the capacitor 806 is effectively removed from the circuit.

If the frequency of the relaxation oscillator is made approximately seven cycles per second, by suitable adjustment of the values of the components, a highly pleasing vibrato is obtained. Obviously, equally satisfactory vibrato effects could be obtained from other fluctuating light sources.

In order that the mean pitch of the master oscillator be unaffected by the application of the vibrato, I have provided an extra capacitor 814 which has a capacitance of one half the capacitance of capacitor 806. Capacitor 814 is connected to ground by a switch contact 815 whenever the vibrato is turned off and is removed from the circuit when the vibrato is turned on. In this way the application of the vibrato effect causes the pitch of the master oscillator to rise above and fall below a median pitch by precisely the same percentage and the tuning of the instrument is unaffected. When the vibrato is turned on, both cells would be subjected to the same fluctuating light source.

The "Direct" Keying System

One of the oldest problems facing the designer of electronic musical instruments is the problem of obtaining thumpless, chickless, transient-free, keying characteristics. In instruments employing continuously running tone generators it is necessary to switch the signal currents from the various oscillators into the amplification circuits by means of key operated switches. If ordinary switches are employed, key clicks and transients at the moment of opening or closing the switch contact are unavoidable because of the speed of the electronic reaction. As early as 1933, it was suggested that these transients could be eliminated by employing gradual resistance key switches (Smiley patent, U.S. Patent Re. 20,831). One particular form of such a resistance key switch is described in the patent issued to Kock, 2,215,124. All of the switches described in these patents have the disadvantage that they are rather difficult to manufacture and involve expensive tooling and manufacturing processes. In addition, the sliding or rolling contacts obtained with the resistance elements, as shown in the Kock patent, can result in wear and eventual failure of the gradual resistance contact with resultant noise or static of the type that one experiences when adjusting the volume of an old radio receiver.

Referring now to FIGURES 4 and 5, the upper terminal 12 and central terminal 14 lie apart when the circuit is open. The fibrous body 16 between them has cilia or very light fuzz projecting from both sides (see FIGURE 7). It is dipped or suitably impregnated with a colloidal suspension of graphite or other carbonaceous material. Many conducting paints and other equivalent preparations are well known in the electronic art and, per se, form no part of the present inventions. Accordingly, this specification is not encumbered with those details. One suitable conducting paint is manufactured by the Micro-Circuits Co. of New Buffalo, Michigan, and sold under the trade description R-21. The material has sufficient resilience to let the face of each terminal generate a depression in the surface and get full area of contact, but the surface substantially resumes its flat condition when the contacts are separated.

A cheap handkerchief, or the type of thin flannel commonly used in pajamas, does quite well for the body 16. For the purpose intended, these resistance switches ordinarily switch a flow of low voltage and almost infinitesimal current.

The playing key 19 actuates a light leaf spring 20 and the deflection of the leaf spring moves the terminal 14 to closed position when the rear end of the key is raised by depressing its front end.

With the inner end of the key down, there is an air gap between terminal 12 and the body 16. As the lower contact 14 rises from the open key position to the closed-key position of FIGURE 4, the initial contact of the cilia 18 establishes a conductive path of high resistance, which resistance decreases slowly at first as the cilia bend and buckle, and then more rapidly as the terminals get close enough to deform the threads 22 of the body of the fabric (see FIGURE 7).

The time interval between the open condition of the switch, and the closed condition of FIGURE 4 is some finite time, depending on the speed of movement of the key, but the shortest such period is so long, compared with the time it takes an electric current to start flowing, that such a contact completely eliminates all transients of high enough frequency to generate undesirable noises.

Various types of resistance key switch for eliminating undesirable transients have been proposed. Many makers of electronic organs, and the like have tried resistance key switches and patented them, and eventually abandoned them and gone back to plain metallic contacts, tolerating the undesirable transients as the lesser of two evils.

The problem of an effective switch of this type involves four obstacles:

(1) High cost.
(2) Wear in use and erratic functioning.
(3) A requirement for excessive pressure, especially when one key has to close a plurality of switches.
(4) In the case of the sliding or rubbing contacts that have been proposed, the fingers of the player feel the damping action of the friction. The grinding sensation is not only unpleasant, but it also increases the muscular effort required and fatigues the player.

In the switch disclosed, the fourth objection is found imperceptible. The first objection is eliminated because almost nothing could be cheaper than a bit of cloth. The key pressure for each switch is a minor fraction of that required in the prior art, and the four switches of FIGURE 5, do not overload the player's fingers.

Finally, the operation is smooth and almost unchanged during frequent use over periods up to several years. More, if any wear should become noticeable, the single cloth strip 16 can be shifted longitudinally a little to bring a new area into the pressure zone and start a new use period of several years more.

I have indicated clamps 24 for holding the strip 16 in any adjusted working position.

In FIGURE 4, I have indicated a bottom contact 26 for closing a different circuit by direct metallic contact when the player releases the key 19. This circuitry is irrelevant to the functioning of the upper contact. It will be obvious that the lower contact could also be provided with a carbonized cloth insert according to FIGURE 7 if desired.

In the embodiment of FIGURE 6, the key 19 lifts a riser 28 perforated to receive four spaced flexible contact terminals 30 which may all be rigidly mounted in a fixed support 32. The parallel rods 34 complete the switching means, and the single key can close four independent circuits at once without imposing an objectionable mechanical load on the fingers of the player.

*The "Electronic" Keying System*

The gradual resistance keys described in the preceding section are very effective in eliminating key transients, but no resistance key switch is capable of duplicating the attack and decay characteristics of acoustic instruments.

I have indicated in FIGURE 1 an electronic keying system that is capable of duplicating almost exactly the attack and decay characteristics of organ pipes and that can be adjusted to produce the attack and decay characteristics of the very large organ pipes or of the very smallest organ pipes.

Connected between the output terminals of each tone producing oscillator I employ a photo-sensitive resistor such as the one shown at 432. The other terminal of this photo-resistor is connected to a tone collecting bus bar 502. This bus bar 502 is also connected to ground through load resistor 504, or through resistors 504 and 522, depending on the position of switch 520. Associated with photo-resistor 432 is a light source which is shown at 434 as an incandescent type lamp. This lamp is connected to a switch operated by playing key 436 to connect the lamp with a source of potential 506. Depressing playing key 436 closes switch 437 and connects power from source 506 to the lamp 434 which causes it to illuminate the photo-resistor 432.

The photo-resistors that I employ will be more fully described hereinafter, but they have the characteristic that their resistance changes from a value of several megohms in the dark condition to a resistance of 100 ohms or less when illuminated. Therefore, depressing key 436 permits the transmission of the signal from the output terminal 424 into the amplification system. The rate at which the resistance of the photo-resistor changes determines the attack and decay characteristics of the resultant sounds.

I have found that several factors influence this resistance change and that these include the characteristics of the lamp, the characteristics of the photo-resistor, and the impedances of the signal circuit including the source impedance of the tone generator and the input impedance of the amplification system. I have found that incandescent lamps having relatively thin filaments work very satisfactorily for most purposes. Using lamps with heavy filaments causes a more sluggish decay characteristic and using lamps of the gas-filled variety produce the quickest attack and decay characteristic because they have no thermal lag. However, even with gas-filled tubes, the natural "time constant" of the photo-resistors produce a smoothness that is ordinarily obtainable only in much more complex circuits employing keyer vacuum tubes, together with resistor capacitor circuits to determine the time constant of the attack and decay characteristics.

Figure 3:
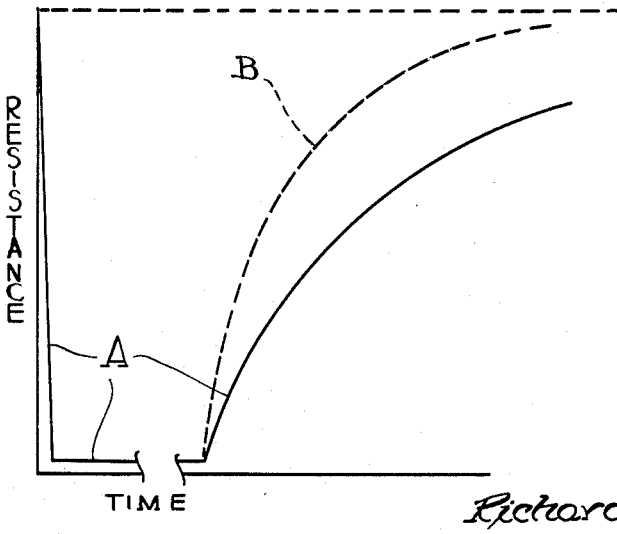
FIGURE 3 is a time-resistance diagram.

It is a characteristic of the photo-resistors that I employ that shining light onto the photo-resistor causes a very prompt although not instantaneous change in resistance to a very low value. Removing the source of light causes the resistance to again assume a very high level but at a much slower rate. Curve A of FIGURE 3 indicates the abrupt drop at the left, and the slow return at the right. By adjusting the circuit impedances to utilize any particular desired portion of this curve it is obvious that it is possible to obtain decay characteristics that differ widely. For example, raising the load impedance, as for example, by opening the switch 520 and thus inserting a resistor 522 in series with resistor 504 between the tone collecting bus bar 502 and ground, it is possible to obtain a much longer decay characteristic simulating the decay characteristic of struck or percussion instruments.

When double photo-resistors 144 and 146 are used, their ground resistances 148 need to be disconnected to get the percussion effect for the high notes also. In FIGURE 1, switch 520 has an additonal terminal for each of the sources provided with double photo-resistors. The parts are shown in FIGURE 1 in percussion position. Closure of switch 520 will short out resistors 522 and ground resistor 148 and give normal decay.

In some cases, particularly for the higher pitched notes, it is a little difficult to achieve a sufficiently short decay characteristic using a single photo-resistor. Therefore, in the higher frequency keying circuits I employ two photo-resistors or a "tapped" photo-resistor in order to make possible a more natural decay characteristic. At 142 in FIGURE 1, I show such a circuit. Here two photo-resistors 144, 146 are connected in series between the tone source 100 and the tone collecting bus bar 520. The common connection between the two photo-resistors is connected to ground through an impedance 148 that is preferably several times the illuminated impedance of the photo-resistors. With such a circuit configuration the decay characteristic is according to the curve B in FIGURE 17 since the attenuation of the network at any given time is the square of the attenuation that would be obtained with the circuit previously described.

*The Photo-Resistors*

The photo-resistors that I employ are preferably, but not necessarily of the cadmium sulfide or cadmium selenide type. By the use of different light-sensitive compounds and different thicknesses and temperature treatments a wide variety of speeds and resistance ratios can be obtained. These photo-resistors, per se, are not my invention. U.S. Patent 2,879,182, Serge Pakswer and 2,879,362, to Ralph L. Meyer, give a few typical instances of what can be accomplished along this line.

FIGURES 8 and 9 indicate the construction of one suitable cell. On the surface of a piece of ceramic material 42 are screened or in a similar manner applied a pair of interlocking grids 44 of a metallic paint, connected to the projecting terminals 46.

In FIGURES 10 and 11 is shown a single cell that can be used in the circuit previously described that ordinarily would require two photo-resistors. In this resistor the grids are divided into sections. The large section 48 has spaced fingers 50. The two small sections 52 each have similar fingers 54 extending in from the opposite side between the fingers 50 of the large section 48. All these sections have their own individual terminals 56 and 58. The completed assembly is coated with the light-sensitive material.

In FIGURE 13 I have indicated a panel board 60, having a series of transverse bores 61. The photo-resistors 62 may be set in cups 63 and assembled on a carrier strip 64. The lights 65 are similarly assembled on a carrier 66. Juxtaposing the parts as shown in FIGURE 13 makes a compact assembly with all terminals readily accessible and each resistor and light isolated from all the others and from extraneous light.

Referring now to FIGURE 17, I have indicated a power source 67, a player-controlled switch 68, which may be either a key switch or a stop switch, and a light source 69. Four light-sensitive resistors 70 are located in the field illuminated by the light source 69, and each such resistor has terminals 71 for connecting it into the circuitry to be controlled.

It will be noted that in FIGURE 6, a single key 19 is used to close four circuits at once mechanically without overloading the muscular strength of the player. A structure according to FIGURE 17 represents a greater cost than the switches of FIGURE 6, but it reduces the mechanical load on the player at least in the ratio of four to one, and the other three quarters of the desired function is supplied by the power source 67.

The connection of one key to a plurality of signal sources is notoriously old in this art. When it is practiced, it necessarily results in having each signal source arranged to be connected to the translating means by any one of the plurality of key switches.

In FIGURE 1, the photo-resistor bank delivers to the bus 502 the various components of the combined signals carried by the bus. Similarly the carbon cloth switches indicated at 16 deliver the corresponding signal components to the bus 510 for the other manual. In each instance, the contact made by the keys may include a plurality of contacts 16-1, 16-2, 16-3 and 16-4, as in FIGURE 6, or the multiple photo-resistors of FIGURE 17.

While the switches 16 are cheaper than the photo-resistors 70 of FIGURE 17, the number of different circuits that can be closed by a single key according to FIGURE 6 has a definite limit for mechanical reasons, but the number of circuits that can be controlled by a single key switch contact according to FIGURE 17 is practically unlimited.

The timing circuits 118, 120, 115 etc., generate a small negative bias at the junction 124 where the signal is taken. This amounts to a small fraction of one volt. It has been found that this bias is immaterial when the signal is keyed through the photo-resistors. But with the cloth switch elements, it tends to produce a slight thump when the key is depressed. To eliminate this thump I carry the signal from bus 510 through a capacitor 512, and bias the bus 510 to substantially the identical potential as the junction 124. The source 514 (see FIGURE 1) maintains the desired potential in resistor 516, and adjustment is by the sliding contact 518.

A further advantage of the electronic switching means of FIGURE 17 is that it facilitates remote control. For example, when it is desired to have the tone generator and other electrical apparatus remote from the organ console.

This is because the switch 68 controls only D.C. current, and the associated switch wires can be of any desired length without problems of capacitive coupling.

Referring now to FIGURES 14, 15 and 16, the translating system begins with the signal coming from the tone collector bus. Each of the tremolos indicated at 602 and 604 in FIGURE 1, is according to the diagram in the left-hand dotted line enclosure in FIGURE 4. Similarly the expression control means 628 in FIGURE 1 is also closed in a dotted line area in FIGURE 14.

The tremolo includes a light-sensitive resistor 608 arranged to shunt the signal in the conductor 610 to ground. The resistor 612 has a value so related to the low resistance characteristic of the light-sensitive resistor 608 that in the low resistance condition the signal is attenuated, or weakened, to the degree desirable to produce a tremolo of a proper aesthetic quality.

Means for varying the resistance of the light-sensitive resistor 608 has been indicated as a conventional light source 614 provided with a power source indicated at 616 and a stop switch 618 accessible to the player for employing the tremolo or for letting the music go through in constant volume. Between the light source 614 and the light sensitive resistor 608 is a rotary cut-off disc having opposed open sectors 620 and opposed closed sectors 622. A motor 624 or negligible power is adequate to rotate the interruptor disc and because the power is negligible it is preferred to let the motor operate continuously during the playing of the instrument so that the stop 618 affects the functioning of the light source only.

After the signal passes through the tremolo, with or without having its amplitude varied by the tremolo, it passes through a preamplifier and filter 626 and to the player's expression control 628. This control is a second attenuation circuit comprising a resistor 630 and a light-sensitive resistor 632 for shunting to ground the signal coming through the resistor 630. The control means for the player is indicated in detail in FIGURE 16 and comprises a foot pedal 634 pivoted at 636 on a suitable support 638 with sufficient friction in the pivot to hold the pedal in any adjusted position. A blade 640 at the upper end of the foot pedal 634 is provided with a tapered slot 642 through which part of or all of the light from the light source 644 may pass to impinge on the light-sensitive resistor 632.

With the foot pedal in the position of FIGURE 16, the light passes through the lower, large end of the slot 642 and the light-sensitive resistor 632 is at its lowest resistance condition and the amount of signal delivered to the power amplifier will be a minimum. It will be obvious that depressing the pedal 634 will move the blade 640 down and gradually decrease the effective area of illumination down to complete extinction, at which time the maximum power of the equipment will be delivered to the loud speaker 646.

Others may readily adapt the invention for use under various conditions of service by employing one or more of the novel features disclosed, or equivalents thereof. As at present advised, with respect to the apparent scope of my invention, I desire to claim the following subject matter:

1. In an electronic musical instrument of the type comprising a multiplicity of sources of audio-frequency signal of accurately predetermined, constant frequency; said sources having frequencies including all the notes of the musical scale; a multiplicity of switches, one for each of said sources; a playing key for each key switch; an electric connection from said key switch for establishing an operative connection for transmitting said signal; and translating means for receiving transmitted signal and generating acoustic oscillations corresponding to the transmitted signal; transmitting means comprising a light source connected to each key switch, a light-sensitive resistor positioned to be illuminated by said light source; said light-sensitive resistor having a low resistance when in illuminated condition, and a resistance many times greater when in unilluminated condition; and a circuit including said light-sensitive resistor for delivering signal with effective amplitude when said light-sensitive resistor is in one condition, and preventing delivery of signal when said light-sensitive resistor is in the other condition, said light-sensitive resistor being characterized by a time delay in changing from high resistance to low resistance, extending over a predetermined time delay, corresponding to the time delay in the attack of an acoustic musical instrument, and a much more prolonged predetermined time factor of return from low resistance to high resistance, corresponding to the decay period characteristic of an acoustical musical instrument.

2. A combination according to claim 1, in which signal is delivered when said light-sensitive resistor is in illuminated condition, and the signal passes directly through said light-sensitive resistor.

3. A combination according to claim 2, in which certain of said sources are arranged to illuminate a plurality of different light-sensitive resistors, each light-sensitive resistor controlling a separate and independent circuit.

4. A combination according to claim 3, in which said separate circuits are transmitting means for additional harmonically related oscillators.

5. A combination according to claim 1, in which certain of said transmitting circuits contain two light-sensitive resistors connected in series; there being a fixed resistors connected in series; there being a fixed resistor connected from between said light-sensitive resistors to ground.

6. An electronic musical instrument comprising, in combination: a multiplicity of signal sources; each of constant audio-frequency; said sources including all the semi-tones of the musical scale; each source having an output circuit including a light-sensitive resistor and a conductor delivering signal from said oscillator to said resistor; a bus bar connected to all said light-sensitive resistors to receive signal from each of said resistor; translating means connected to said bus bar for generating sound waves corresponding to the composite signal on said bus bar; a multiplicity of key switches, one for each oscillator; a playing key for each key switch for opening and closing said switch; and a light source connected to become operative upon actuation of said key switch; said light source being arranged to illuminate said light-sensitive resistor; said light-sensitive resistor having and illuminated condition of low resistance permitting signal to pass to said bus bar, and a dark condition of high resistance preventing signal from passing to said bus bar, said light-sensitive resistor having a predetermined characteristic time delay in its change from dark condition to illuminated condition, and a different predetermined time delay characteristic in its change from illuminated condition to dark condition; said light-sensitive resistor being the only envelope-determining instrumentality acting on the signal.

7. In an electronic organ, in combination: two sets of playing keys; a set of electronic oscillators adapted to be activated by received potential; means for sustained percussion effects associated with one of said sets of keys; said percussion means comprising light-sensitive keying control resistors adapted to transmit signal from oscillators and having a relatively quick response when changing to tone-producing condition from inactive condition, and a relatively slow response during return to inactive condition; metallic key switch elements operatively connected to the other set of keys to move said elements toward each other when a corresponding key is depressed; and a fibrous element normally lying between said metallic elements; said fibrous element being porous and compressible and having an impedance decreasing rapidly under gentle compression down to values opreative to deliver signal from said oscillators.

References Cited in the file of this patent

UNITED STATES PATENTS

| | | |
|---|---|---|
| 1,705,539 | Ruben | Mar. 19, 1929 |
| 1,877,482 | Ruben | Sept. 13, 1932 |
| 1,977,095 | Spielmann | Oct. 16, 1934 |
| 2,033,232 | Eremeeff | Mar. 10, 1936 |
| 2,555,040 | Jordan | May 29, 1951 |
| 2,556,991 | Teal | June 12, 1951 |
| 2,846,914 | Wolgast | Aug. 12, 1958 |
| 2,921,494 | Leslie | Jan. 19, 1960 |
| 3,011,379 | Corwin | Dec. 5, 1961 |

OTHER REFERENCES

Eastman Kodak Co., Kodak Electron Detector, N.Y., 1955.

UNITED STATES PATENT OFFICE
CERTIFICATE OF CORRECTION

Patent No. 3,119,890                                    January 28, 1964

Richard H. Peterson

It is hereby certified that error appears in the above numbered patent requiring correction and that the said Letters Patent should read as corrected below.

Column 1, line 11, for "obects" read -- objects --; column 4, line 52, for "vary" read -- very --; column 8, line 20, for "bus bar 520" read -- bus bar 502 --; column 10, lines 69 and 70, strike out "there being a fixed resistors connected in series;".

Signed and sealed this 1st day of September 1964.

(SEAL)
Attest:

ERNEST W. SWIDER
Attesting Officer

EDWARD J. BRENNER
Commissioner of Patents